(12) United States Patent
Padron et al.

(10) Patent No.: US 12,025,056 B2
(45) Date of Patent: Jul. 2, 2024

(54) EVAPORATIVE COOLING PACK WITH SAME DIRECTION FLUTES DESIGNED TO PREVENT NESTING

(71) Applicant: Parker-Hannifin Corporation, Cleveland, OH (US)

(72) Inventors: Simon Padron, Columbia, TN (US); Thomas D. Carr, Encinitas, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 34 days.

(21) Appl. No.: 17/959,391

(22) Filed: Oct. 4, 2022

(65) Prior Publication Data
US 2023/0040732 A1   Feb. 9, 2023

Related U.S. Application Data

(63) Continuation of application No. PCT/US2021/028855, filed on Apr. 23, 2021.

(60) Provisional application No. 63/014,233, filed on Apr. 23, 2020.

(51) Int. Cl.
*F02C 7/00* (2006.01)
*F02C 7/141* (2006.01)

(52) U.S. Cl.
CPC .......... *F02C 7/141* (2013.01); *F05D 2200/13* (2013.01); *F05D 2200/14* (2013.01); *F05D 2200/15* (2013.01); *F05D 2200/262* (2013.01); *F05D 2200/263* (2013.01); *F05D 2250/38* (2013.01); *F05D 2250/61* (2013.01); *F05D 2260/2214* (2013.01)

(58) Field of Classification Search
CPC .. F02C 7/04; F02C 7/141; F02C 7/143; F05D 2200/13; F05D 2200/14; F05D 2200/15; F05D 2200/262; F05D 2200/263; F05D 2250/38; F05D 2250/61; F05D 2260/2214
See application file for complete search history.

(56) References Cited

U.S. PATENT DOCUMENTS

| | | | | |
|---|---|---|---|---|
| 3,262,682 | A * | 7/1966 | Bredberg | F28F 25/087 261/DIG. 11 |
| 3,792,841 | A * | 2/1974 | Munters | B01D 47/06 261/DIG. 11 |
| 5,143,658 | A * | 9/1992 | Thomas | F28F 25/087 261/112.2 |
| 5,320,651 | A * | 6/1994 | Drummond | B01J 19/32 55/440 |
| 5,775,121 | A * | 7/1998 | Kuma | F24F 5/0007 62/121 |

(Continued)

FOREIGN PATENT DOCUMENTS

| | | |
|---|---|---|
| CN | 2624108 Y | 7/2004 |
| EP | 0725917 B1 | 12/2002 |

(Continued)

*Primary Examiner* — Matthew T Largi
(74) *Attorney, Agent, or Firm* — Reinhart Boerner Van Deuren P.C.

(57) ABSTRACT

An evaporative cooling pack formed from first and second corrugated media sheets is provided. The evaporative cooling pack cools a flow of air using a cooling fluid. The first and second corrugated media sheets have flutes that extend at different angles relative to a reference line and at such relative angles and have flute pitches that inhibit nesting of the adjacent sheets.

19 Claims, 5 Drawing Sheets

(56) References Cited

U.S. PATENT DOCUMENTS

| | | | |
|---|---|---|---|
| 6,260,830 B1 | 7/2001 | Harrison et al. | |
| 8,397,523 B2 * | 3/2013 | Rakuma | A61L 9/00 |
| | | | 62/171 |
| 8,636,269 B2 | 1/2014 | James | |
| 9,551,282 B2 | 1/2017 | Zhang et al. | |
| 9,850,816 B2 * | 12/2017 | Zhang | F02C 7/143 |
| 10,495,000 B2 | 12/2019 | Zhang et al. | |
| 11,493,289 B1 * | 11/2022 | Maisey | F28F 21/067 |
| 11,879,391 B2 * | 1/2024 | Brady | F25B 41/24 |
| 2003/0150234 A1 * | 8/2003 | Ohmi | F28C 1/04 |
| | | | 62/309 |
| 2009/0294548 A1 | 12/2009 | Geiger et al. | |
| 2015/0377569 A1 | 12/2015 | Zhang et al. | |
| 2017/0276386 A1 | 9/2017 | Ponyavin et al. | |
| 2018/0266322 A1 * | 9/2018 | Zhang | F28F 3/12 |
| 2019/0120509 A1 | 4/2019 | Seeley et al. | |

FOREIGN PATENT DOCUMENTS

| | | |
|---|---|---|
| FR | 1380254 A | 11/1964 |
| JP | 2009180433 A | 8/2009 |

\* cited by examiner

EVAPORATIVE COOLING PACK WITH SAME DIRECTION FLUTES DESIGNED TO PREVENT NESTING

CROSS-REFERENCE TO RELATED PATENT APPLICATIONS

This patent application is a continuation of U.S. PCT Application No. PCT/US2021/028855, filed on Apr. 23, 2021. This patent application claims the benefit of U.S. Provisional Patent Application No. 63/014,233, filed Apr. 23, 2020, the entire teachings and disclosure each of which are incorporated herein by reference thereto.

FIELD OF THE INVENTION

This invention generally relates to evaporative cooling and particularly evaporative cooling pads for cooling inlet air into a gas turbine.

BACKGROUND OF THE INVENTION

Gas turbines engines are widely utilized in fields such as power generation. A conventional gas turbine engine includes a compressor for compressing ambient air, a combustor for mixing the compressed air with a flow of fuel and combusting the mixture, and a turbine that is driven by the combustion mixture to produce power.

Various strategies are known for increasing the amount of power that a gas turbine engine may be able to produce. One method of increasing the power output is by cooling the ambient air upstream of the compressor. Such cooling may cause the air to have a higher density, thereby creating a higher mass flow rate into the compressor. The higher mass flow rate into the compressor allows more air to be compressed so as to allow the gas turbine to produce more power. Additionally, cooling the ambient air generally may increase the overall efficiency of the gas turbine engine in hot environments.

Various systems and methods may be utilized to cool the ambient air entering a gas turbine engine. For example, heat exchangers may be utilized to cool the ambient air through latent cooling or through sensible cooling. Such heat exchangers often may utilize a evaporative cooling pack to facilitate cooling of the ambient air. These evaporative cooling packs may allow heat and/or mass transfer between the ambient air and a coolant flow. The ambient air interacts with the coolant flow in the evaporative cooling pack for heat exchange therewith. These evaporative cooling packs may also be referred to as media pads.

The evaporative cooling packs include layers of corrugated sheets that have flutes that define air flow paths through the evaporative cooling pack.

Figure 1:
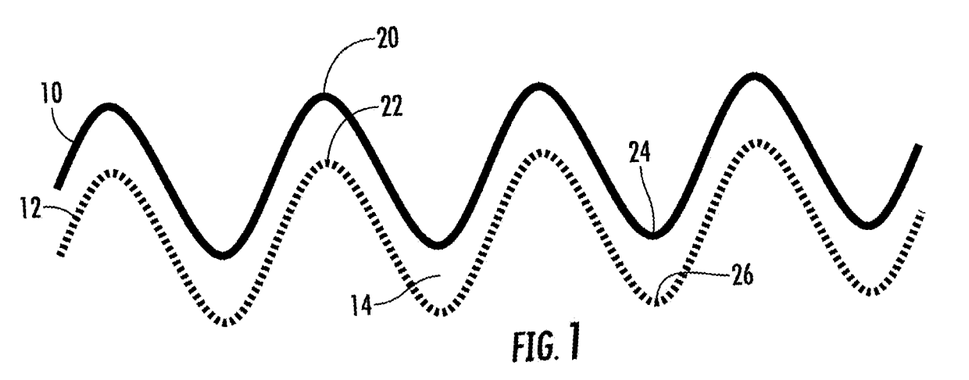
FIG. 1 is a schematic representation of nested sheets of an evaporative cooling pack.

FIG. 1 illustrates a problem of nesting for evaporative cooling packs that use the stacked layers of corrugated sheets. In this example, two media sheets 10 (solid line), 12 (dashed line) are illustrated. Here, the corrugations of adjacent sheets nest within one another. Due to the nesting, the air flow passages 14 formed between the adjacent sheets 10, 12 are closed off restricting air flow. The restricted air flow can reduce the efficiency of the media pack.

Nesting can be particularly problematic with evaporative cooling packs when the flute angles of all sheets are oriented with the same positive or negative slopes. This allows, as illustrated in FIG. 1, the peaks 20 of one sheet 10 to align with the peaks 22 of the adjacent sheet 12 and similarly the valleys 24 of one sheet 10 to align with the valleys 26 of the adjacent sheet 12 such that the sheets will nest with one another.

Figure 2:
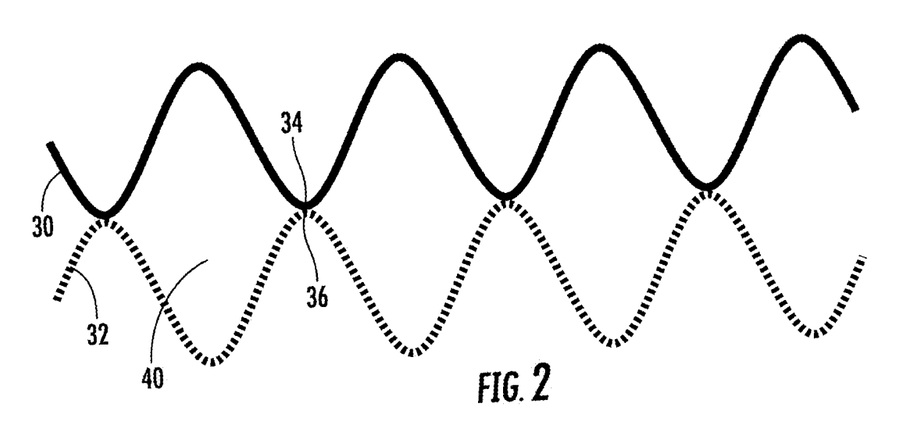
FIG. 2 is a schematic representation of sheets of an evaporative cooling pack that are not nested.

FIG. 2 illustrates a preferred arrangement of adjacent sheets 30 (solid line), 32 (dashed line). Here, the valleys 34 of one sheet 30 align with the peaks 36 of the adjacent sheet 32. This creates interference that prevents the two sheets 30, 32 from nesting with one another maximizing the cross-sectional area of the flow passages 40 formed between the adjacent sheets 30, 32.

Examples of the present disclosure provide improvements in evaporative cooling packs for use in evaporative cooling systems that use cooling fluid to cool a flow air passing through the evaporative cooling packs.

BRIEF SUMMARY OF THE INVENTION

In one example, a new and improved evaporative cooling pack is provided that inhibits nesting of adjacent sheets of the evaporative cooling pack. In another example, a new and improved evaporative cooling system using the evaporative cooling pack is provided.

In an example, an evaporative cooling pack formed from first and second corrugated media sheets is provided. The evaporative cooling pack cools a flow of air using a cooling fluid. The first corrugated media sheet has a first section of a plurality of flutes. The flutes of the first section of a plurality of flutes extend at a first angle ($\theta_1$) relative to a reference line. The first section of a plurality of flutes has a first flute pitch ($f_1$) measured perpendicular to the flutes of the first section. The flutes of the first section of a plurality of flutes have a depth (d) measured parallel to the reference line. The second corrugated media sheet is adjacent the first corrugated media sheet. The second corrugated media sheet has a second section of a plurality of flutes. The first section of a plurality of flutes being adjacent the second section of a plurality of flutes, when the sheets are stacked. The second section of a plurality of flutes has a second flute pitch ($f_2$) measured perpendicular to the flutes of the second section. The flutes of the second section of a plurality flutes extend at a second angle ($\theta_2$) relative to the reference line. The second angle ($\theta_2$) is different than the first angle ($\theta_1$). The second angle ($\theta_2$) has a minimum value determined by the equation:

$$\phi_{2,min} = \tan^{-1}\left[\frac{d\tan(\phi_1) + \left(\frac{f_1}{\cos(\phi_1)}\right)}{d}\right],$$

The second flute pitch ($f_2$) relative to the first flute pitch ($f_1$) is determined by the equation:

$$f_2 = \left(\frac{f_1}{\cos(\phi_1)}\right) * \cos(\phi_{2,min}).$$

In one example, the first corrugated media sheet has a third section of a plurality of flutes. The flutes of the third section of a plurality of flutes extending at a third angle ($\theta_3$) relative to the reference line. The third angle ($\theta_3$) is different than the first and second angles ($\theta_1$, $\theta2$).

In one example, the flutes of the first section of a plurality of flutes have a positive slope relative to the reference line and the flutes of the third section of a plurality of flutes have a negative slope relative to the reference line.

In one example, the flutes of the second section of a plurality of flutes have a positive slope relative to the reference line.

In one example, flutes of the first section are connected to flutes of the third section forming a continuous flute having a bend where the flutes of the first section are connected to a flutes of the third section.

In one example, the reference line is parallel to a first side of the first sheet and a first side of the second sheet. The first side of the first sheet being parallel to the first side of the second sheet.

In one example, the first sheet has first, second, and third sides. The first side extends between the second and third sides and in perpendicular relation to the second and third sides. The second and third sides are parallel. The second sheet has first, second, and third sides. The first side extends between the second and third sides and in perpendicular relation to the second and third sides. The second and third sides are parallel. The reference line is parallel to the first side of the first sheet and parallel to the first side of the second sheet.

In one example, the flutes of the first section of a plurality of flutes extend in parallel relation to one another. The flutes of the second section of a plurality of flutes extend in parallel relation to one another.

In one example, the third angle is different than the first angle in that a slope of the flutes of the first section of a plurality of flutes relative to the reference line is positive and a slope of the flutes of the third section of a plurality of flutes is negative relative to the reference line.

In one example, the third angle ($\theta_3$) is different than the first angle ($\theta_1$) in that the magnitude of the third angle ($\theta_3$) is greater than a magnitude of the first angle ($\theta_1$). Both the first and third angles ($\theta_1$, $\theta_3$) are acute angles.

In one example, the first sheet includes a fourth side parallel to the first side of the first sheet. The second sheet has a fourth side parallel to the first side of the second sheet. The fourth sides providing a cooling fluid inlet. The second sides provides an air inlet. The third side is an air outlet. The flutes of the first section of flutes have an upward directed component extending against gravity when moving in a direction extending towards the third side from the second side. The flutes of the second section of flutes having an upward directed component extending against gravity when moving in a direction extending towards the third side from the second side.

In one example, the flutes of the third section have a downward directed component extending with gravity when moving in a direction extending towards the third side from the second side.

In one example, the flutes of the third section begin at the second side and do not extend to the third side. The flutes of the first section begin offset from the second side and end at the third side.

In one example, the first section of a plurality of flutes are adjacent a first portion of the second section of a plurality of flutes and the third section of a plurality of flutes are adjacent a second portion of the second section of a plurality of flutes, e.g. when the first and second sheets are stacked.

In one example, a plurality of first corrugated media sheets and a plurality of second corrugated media sheet, the first and second corrugated media sheets alternatingly stacked between first and second corrugated media sheets.

In one example, the bends are positioned between the second and third sides and form an axis that is generally perpendicular to the reference line.

In one example, the axis is positioned closer to the outlet side than the inlet side.

In another example, an evaporative cooling system is provided. The system includes an enclosure having a cooling fluid supply, an air inlet, and an air outlet. The system includes an evaporative cooling pack as outlined above positioned within the enclosure between the air inlet and the air outlet. The flutes of the first section of a plurality of flutes and the flutes of the second section of a plurality of flutes oriented such that air exiting the evaporative cooling fluid has an upward extending orientation.

In one example, the cooling fluid supply is positioned such that cooling fluid flows through the evaporative cooling pack vertically downward due to gravity.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 3:
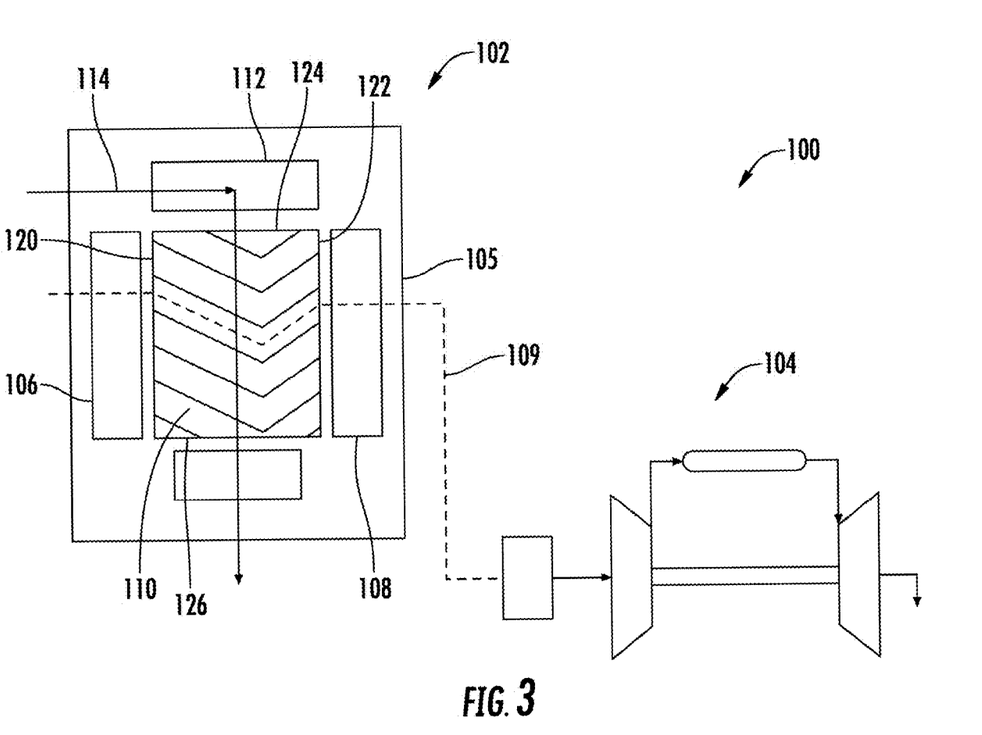
FIG. 3 is a schematic illustration of a gas turbine system that includes an evaporative cooling system according to an example of the disclosure.

FIG. 3 is a schematic illustration of a gas turbine system 100 that includes an air intake 102 that supplies air to the gas turbine 104. The air intake 102 includes an enclosure 105 that has an air inlet 106 and an air outlet 108. Air 109 that is combusted within the gas turbine 104 enters through the inlet 106 and exits through outlet 108.

An evaporative cooling pack 110 is located within the enclosure 105 between the air inlet 106 and air outlet 108. A cooling fluid supply 112 is located within the enclosure 105 to provide cooling fluid 114 to the evaporative cooling pack 110.

In this example, the cooling fluid supply 112 is located vertically above the evaporative cooling pack 110 and the cooling fluid 114 flows vertically downward through the evaporative cooling pack 110. The air 109 flows laterally through the evaporative cooling pack 110 in a crosswise orientation relative to the flow of cooling fluid 114.

The cooling fluid supply 112 may have nozzles spread across the top of the evaporative cooling pack 110. As noted above, the cooling fluid 114, in this example, flows vertically downward to maintain the evaporative cooling pack 110 moist so that the air 109 flowing through the evaporative cooling pack 110 can interact with the cooling fluid 114 and transfer heat to the cooling fluid 114.

In this example, side 120 of the evaporative cooling pack 110 forms an inlet side where the air 109 enters the evaporative cooling pack 110. Opposed side 122 forms an outlet side where air 109 exits the evaporative cooling pack 110. Side 124 forms the vertical top of the evaporative cooling pack 110 and forms a cooling fluid inlet. Any cooling fluid 114 that is not evaporated will exit the evaporative cooling pack 110 through side 126 which forms the vertical bottom of the evaporative cooling pack 110 and forms a cooling fluid outlet.

In some examples, the evaporative cooling pack 110 is rectangular such that sides 120, 122 are parallel to one another and perpendicular to sides 124, 126, which are also parallel to one another.

Figure 4:
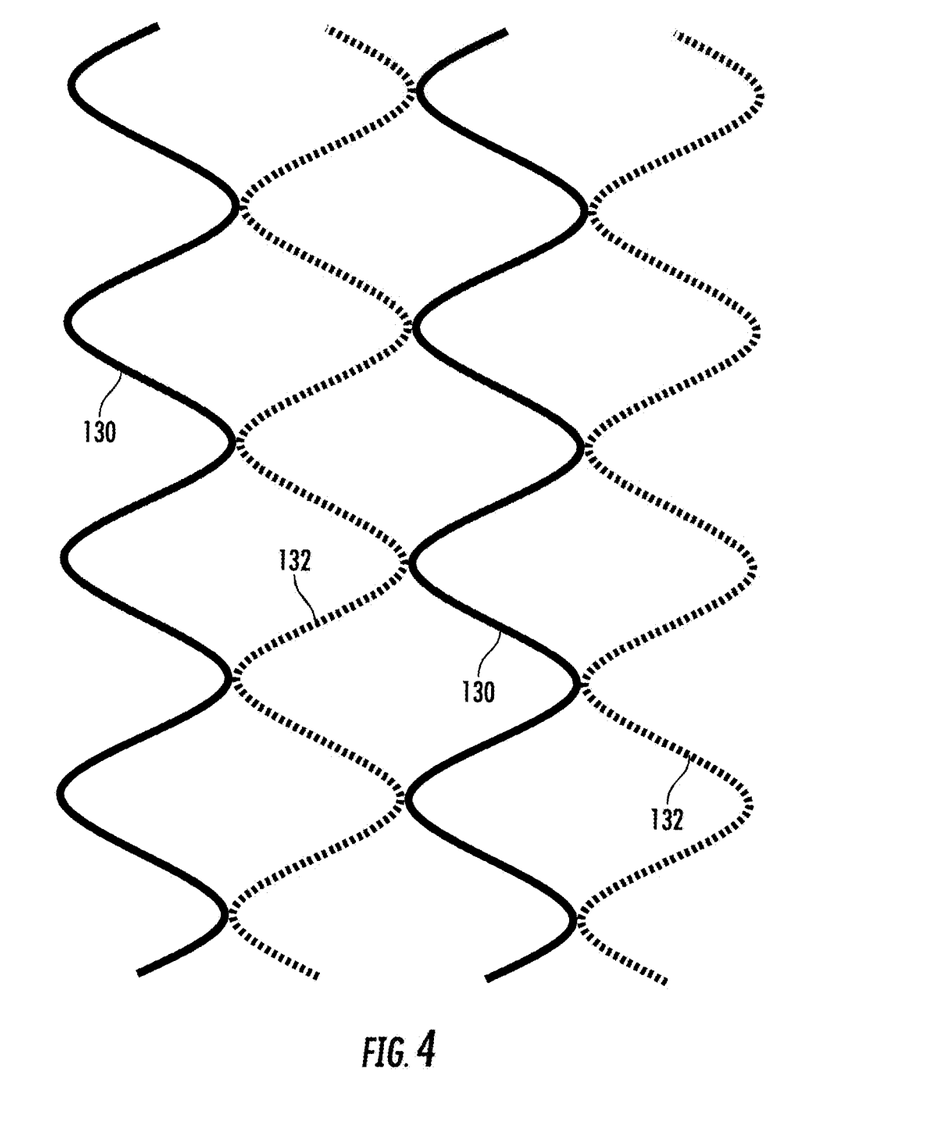
FIG. 4 is a schematic illustration of a side of an evaporative cooling pack according to the present disclosure.

The evaporative cooling pack 110 is formed from a plurality of layers of corrugated sheets. FIG. 4 illustrates a side view of a evaporative cooling pack 110 in simplified schematic form illustrating a plurality of sheets stacked adjacent one another. In this example, there are a plurality of first sheets 130 (solid lines) and a plurality of second sheets 132 (dashed lines) in alternating fashion such that each first sheet 130 is positioned between a pair of second sheets 132 and each second sheet is positioned between a pair of first sheets 130.

The peaks and valleys of the sheets 130, 132 form flutes in each sheet 130, 132. The flutes in adjacent sheets 130, 132 combine to form flow passages 134 for air to flow through as it is cooled.

Figure 5:
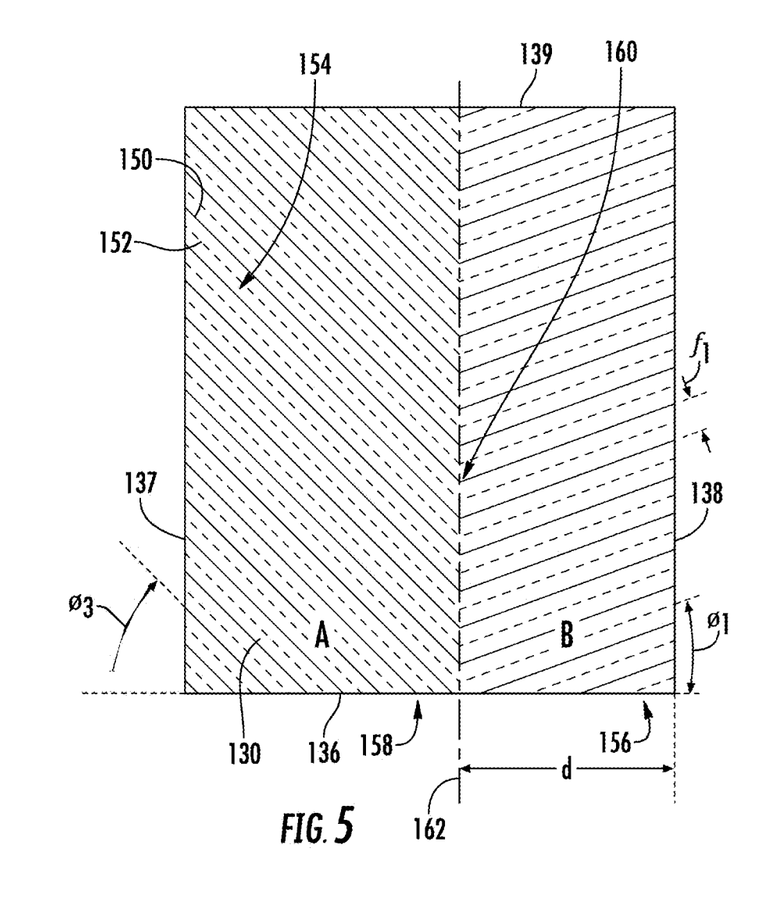
FIG. 5 is a simplified illustration of a first sheet of the evaporative cooling pack of FIG. 4.
Figure 6:
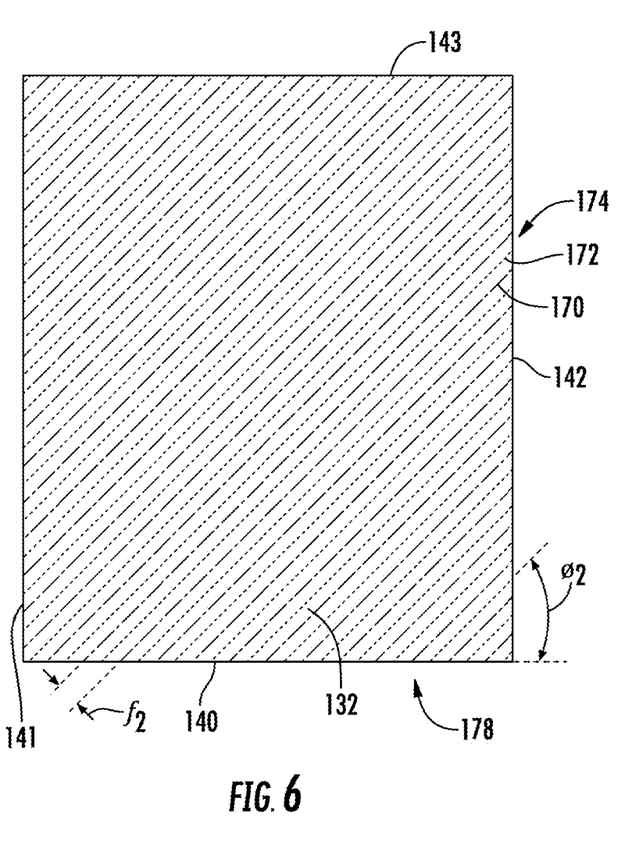
FIG. 6 is a simplified illustration of a second sheet of the evaporative cooling pack of FIG. 4.

FIG. 5 is a simplified illustration of an example of a first sheet 130 while FIG. 6 is a simplified illustration of an example of a second sheet 132. In this figures, solid lines represent peaks while dashed lines represent valleys between adjacent peaks.

In the illustrated example, the sheets 130, 132 are rectangular in shape with each first sheet 130 having first side 136, second side 137, third side 138 and fourth side 139. The first and fourth sides 136, 139 being parallel. The second and third sides 137, 138 being parallel. The first and fourth sides 136, 139 being perpendicular to the second and third sides 137, 138.

Each second sheet 132 has first side 140, second side 141, third side 142 and fourth side 143. The first and fourth sides 140, 143 being parallel. The second and third sides 141, 142 being parallel. The first and fourth sides 140, 143 being perpendicular to the second and third sides 141, 142.

When stacked, the first sides 136, 140 are adjacent one another, the second sides 137, 141 are adjacent one another, the third sides 138, 142 are adjacent one another and the fourth sides 139, 143 are adjacent one another such that the resulting evaporative cooling pack 110 is a generally rectangular prism.

In this example, the second sides 137, 141 form the air inlet into the evaporative cooling pack 110, the third sides 138, 142 form the air outlet from the evaporative cooling pack 110 and, when used in a system as illustrated in FIG. 3, the fourth sides 139, 143 from the cooling fluid inlet/receiving end of the evaporative cooling pack 110.

In this example, the peaks and valleys 150 (solid lines), 152 (dashed lines) form flutes 154 that extend between the second and third sides 137, 138. Notably, the first sheet 130 includes a first section of flutes 156 and a third section of flutes 158. For some or most of the flutes 154, a portion of the flute 154 is formed by the first section of flutes 156 and a portion of the flute is formed by the third section of flutes 158.

Here, the portion of the flute 154 formed in the first section of flutes 156 has a first angle $\theta_1$ (also referred to as a first flute angle) formed between a reference line, e.g. first side 136 while the portion of the flute 154 formed in the third section of flutes 158 has a third angle $\theta_3$ (also referred to as a third flute angle) relative to the reference line, again, e.g. first side 136.

In this example, the first and third angles $\theta_1$, $\theta_3$ are different angles. In this example, the angles are different both in magnitude and slope when viewed moving from the second side 137 to the third side 138. Third angle $\theta_3$ has a larger magnitude than first angle $\theta_1$. In this example, the portion of flute 154 in the first section of flutes 156 has a positive slope relative to first side 136. More particularly, it extends vertically upward when moving laterally in a direction extending from the inlet side towards the outlet side while the portion of flute 154 in the third section of flutes 158 has a negative slope relative to first side 136 when moving in the same direction from the second side 137 to the third side 138. More particularly, it extends vertically downward when moving laterally from the inlet side towards the outlet side.

Notably, the first and third angles $\theta_1$, $\theta_3$ are both angles relative to first side 136.

In some examples, the portion of flute 154 within the first section of flutes 156 directs air flow generally vertically against gravity while the portion of flute 154 within the third section of flutes 158 directs air flow generally vertically with gravity. Notably, in addition to the vertical components just mentioned, the air flow also has a lateral component as the air flows from the inlet side to the outlet side (e.g. from second side 137 to third side 138).

The difference in angles $\theta_1$, $\theta_3$ create a bend 160 in each flute 154 when moving from the inlet side, e.g. second side 137 to the outlet side, e.g. third side 138. In this example, the bends 160 of adjacent flutes generally defines an axis 162 that is generally parallel to second and third sides 137, 138 and generally perpendicular to first and fourth sides 136, 139.

In this example, both portions of each flute 154 (i.e the portions that form section 156 and the portions that form section 158) extend at non-parallel, non-perpendicular angles to all of the sides 136-139 of the first sheet.

The portion of the flute 154 within the first section of flutes 156 has a pitch $f_1$ that is measured generally perpendicular to the extension of the flute 154 within first section of flutes 156. Preferably, all of the portions of the flutes within the first section of flutes 156 are parallel to one another. The portions of the flutes 154 within the third section 158 may or may not be parallel to one another.

Further yet, the first section of flutes 156 has a depth d measured parallel to the reference line, e.g. first side 136. In this example, depth d is measured between axis 162 and third side 138.

FIG. 6 illustrates the second sheet 132. The second sheet 132 is corrugated and has peaks and valleys 172, 170 illustrated by dash-dot and dotted lines, respectively. Again, the peaks and valleys 172, 170 define flutes 174 that form portions of the air passages through the evaporative cooling pack 110, when stacked with the first sheets 130.

In this example, the flutes 174 are substantially linear their entire extension when moving from second side 141 towards third side 142. Here, the entire sheet 132 forms a second section of flutes 178. In this example, the second section of flutes 178 has a second angle $\theta_2$ relative to the reference line, e.g. first side 140. To avoid nesting, the second angle $\theta_2$ has a different magnitude than first angle $\theta_1$. This is particularly true as both the first and second angles $\theta_1$, $\theta_2$ have a positive slope relative to the reference line. If the angles were the same, then nesting would be highly probable between first and second sections 156, 178 when stacked to form evaporative cooling pack 110.

When stacked, both the first and third sections 156, 158 of the first sheet 130 will be adjacent to corresponding portions of the second section 178 of the second sheet 132. However, due to the fact that the third section 158 has a negative slope and the second section 178 has a positive slope, nesting is unlikely as between those sections.

The closer that the magnitudes of the first and second angles $\theta_1$, $\theta_2$ are, the more likely that nesting will occur. The applicants have determined that based depth d, first angle $\theta_1$, and flute pitch $f_1$, a minimum angle $\theta_{2,min}$ for second angle $\theta_2$ can be determined based on the following equation:

$$\phi_{2,min} = \tan^{-1}\left[\frac{d\tan(\phi_1) + \left(\frac{f_1}{\cos(\phi_1)}\right)}{d}\right],$$

and a flute pitch $f_2$ can determined based on the following equation:

$$f_2 = \left(\frac{f_1}{\cos(\phi_1)}\right) * \cos(\phi_{2,min}).$$

to avoid or significantly limit nesting between the flutes 154, 174 in the first and second sections of flutes 156, 178. This is particularly true, where the slopes of the flutes 154, 157 are both positive or both negative in other examples.

With these constraints and with the first sheet 130 below the second sheet 132, the peaks 150 of the first section of flutes 156 of the first sheet 130 will cross/intersect one or more valleys 170 of the second section of flutes 178 of the second sheet 132. This crossing/intersecting therebetween prevents the nesting. Again, this assumes that the second sheet 132 is located on top of the first sheet 130. Alternatively, when the first sheet 130 is on top of the second sheet 132, the valleys 152 of the first section of flutes 156 of the first sheet 130 will cross/intersect one or more peaks 172 of the second section of flutes 178 of the second sheet.

Figure 7:
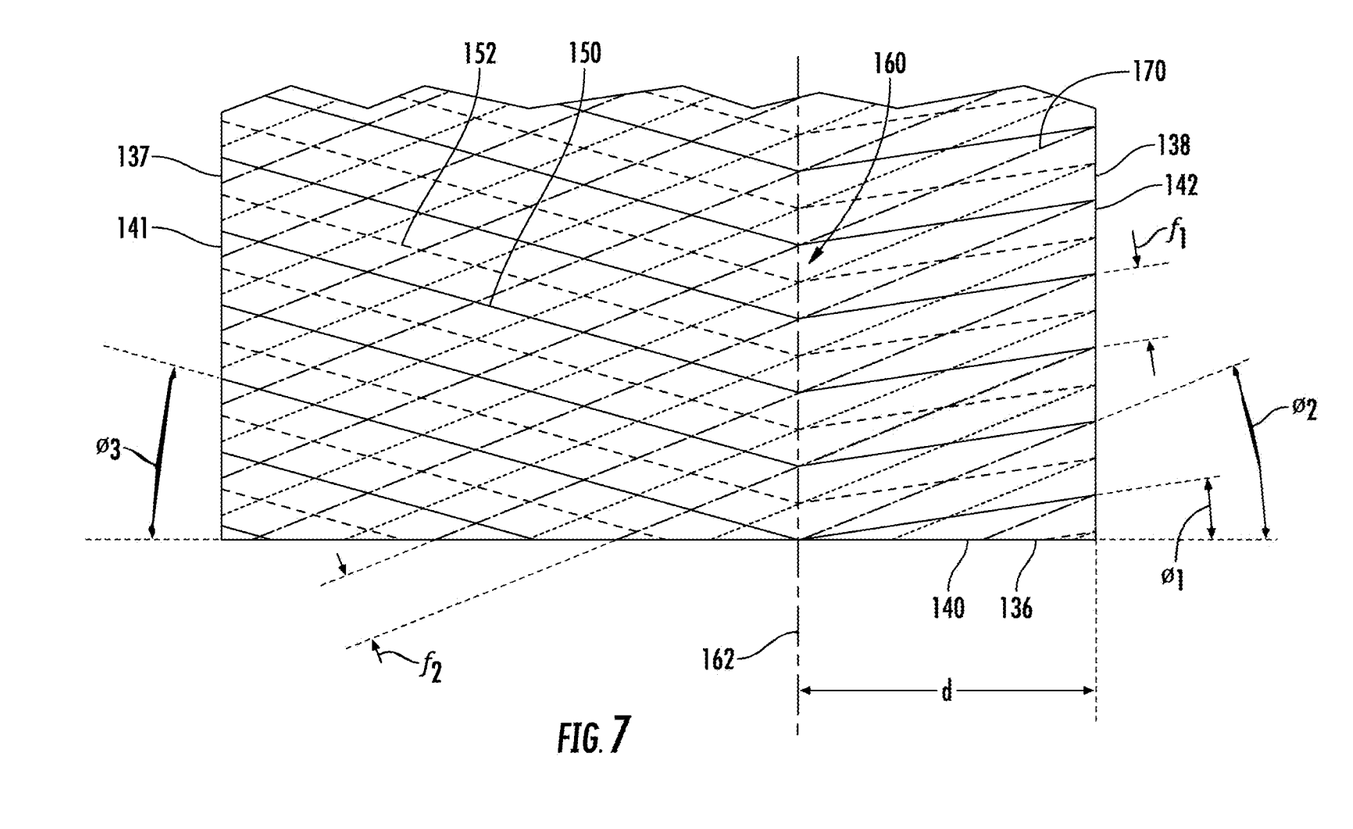
FIG. 7 is a simplified schematic illustration of the first and second sheets of FIGS. 5 and 6 stacked to show the relative orientations of the flutes of the first and second sheets.

In a preferred arrangement, the intersection of the corresponding peaks 150/valleys 170 occurs in two locations such as proximate axis 162 and proximate the third sides 138, 142 as illustrated in FIG. 7. Notably, in FIG. 7, the valleys 170 of the second sheet that intersect at two locations actually intersects two separate peaks 150 of the first sheet. More particularly, a given valley 170 of the second sheet intersects a first peak 150 (e.g adjacent axis 162) and then also intersects a second peak 150 (e.g. adjacent sides 138/142).

The combinations of the first, second and third angles $\theta_1$, $\theta_2$, $\theta_3$ can control air flow through the evaporative cooling pack and thus how quickly the cooling fluid evaporates. It is desired to keep substantially the entire vertical extent of the evaporative cooling pack 110 moist so that air flowing through all of the flutes at all vertical positions is exposed to the cooling effect of the evaporative cooling pack 110.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An evaporative cooling pack for cooling a flow of air using a cooling fluid, the evaporative cooling pack comprising:
   a first corrugated media sheet, the first corrugated media sheet having a first section of a plurality of flutes, the flutes of the first section of the plurality of flutes extending at a first angle ($\theta_1$) relative to a reference line, the first section of the plurality of flutes having a first flute pitch ($f_1$) measured perpendicular to the flutes of the first section, the flutes of the first section of the plurality of flutes having a depth (d) measured parallel to the reference line;
   a second corrugated media sheet adjacent the first corrugated media sheet, the second corrugated media sheet having a second section of the plurality of flutes, the first section of the plurality of flutes being adjacent the second section of the plurality of flutes, the second section of the plurality of flutes having a second flute pitch ($f_2$) measured perpendicular to the flutes of the second section, the flutes of the second section of the plurality flutes extending at a second angle ($\theta_2$) relative to the reference line, the second angle ($\theta_2$) being different than the first angle ($\theta_1$); and wherein the second angle ($\theta_2$) has a minimum value determined by the equation:

$$\phi_{2,min} = \tan^{-1}\left[\frac{d\tan(\phi_1) + \left(\frac{f_1}{\cos(\phi_1)}\right)}{d}\right],$$

and the second flute pitch ($f_2$) relative to the first flute pitch ($f_1$) is determined by the equation:

$$f_2 = \left(\frac{f_1}{\cos(\phi_1)}\right) * \cos(\phi_{2,min}).$$

2. The evaporative cooling pack of claim 1, wherein the first corrugated media sheet has a third section of the plurality of flutes, the flutes of the third section of the plurality of flutes extending at a third angle ($\theta_3$) relative to the reference line, the third angle ($\theta_3$) being different than the first and second angles ($\theta_1$, $\theta_2$).

3. The evaporative cooling pack of claim 2, wherein the flutes of the first section of the plurality of flutes have a positive slope relative to the reference line and the flutes of the third section of the plurality of flutes have a negative slope relative to the reference line.

4. The evaporative cooling pack of claim 3, wherein the flutes of the second section of the plurality of flutes have a positive slope relative to the reference line.

5. The evaporative cooling pack of claim 2, wherein the flutes of the first section are connected to the flutes of the third section each forming a continuous flute having a bend where the flutes of the first section are connected to the flutes of the third section.

6. The evaporative cooling pack of claim 1, wherein the reference line is parallel to a first side of the first corrugated media sheet and a first side of the second corrugated media sheet, the first side of the first corrugated media sheet being parallel to the first side of the second corrugated media sheet.

7. The evaporative cooling pack of claim 5, wherein:
the first corrugated media sheet has first, second, and third sides, the first side extending between the second and third sides and in perpendicular relation to the second and third sides, the second and third sides being parallel;
the second corrugated media sheet has first, second, and third sides, the first side extending between the second and third sides and in perpendicular relation to the second and third sides, the second and third sides being parallel; and
the reference line is parallel to the first side of the first corrugated media sheet and parallel to the first side of the second corrugated media sheet.

8. The evaporative cooling pack of claim 1, wherein:
the flutes of the first section of the plurality of flutes extend in parallel relation to one another; and
the flutes of the second section of the plurality of flutes extend in parallel relation to one another.

9. The evaporative cooling pack of claim 2, wherein the third angle is different than the first angle in that a slope of the flutes of the first section of the plurality of flutes relative to the reference line is positive and a slope of the flutes of the third section of the plurality of flutes is negative relative to the reference line.

10. The evaporative cooling pack of claim 9, wherein the third angle ($\theta_3$) is different than the first angle ($\theta_1$) in that a magnitude of the third angle ($\theta_3$) is greater than a magnitude of the first angle ($\theta_1$), both the first and third angles ($\theta_1$, $\theta_3$) being acute angles.

11. The evaporative cooling pack of claim 7, wherein:
the first corrugated media sheet includes a fourth side parallel to the first side of the first corrugated media sheet;
the second corrugated media sheet has a fourth side parallel to the first side of the second corrugated media sheet;
each fourth side providing a cooling fluid inlet;
each second side providing an air inlet, each third side being an air outlet;
the flutes of the first section of the plurality of flutes having an upward directed component extending against gravity when moving in a direction extending towards the third side of the first corrugated media sheet from the second side of the first corrugated media sheet; and
the flutes of the second section of the plurality of flutes having an upward directed component extending against gravity when moving in the direction extending towards the third side of the second corrugated media sheet from the second side of the second corrugated media sheet.

12. The evaporative cooling pack of claim 11, wherein the flutes of the third section have a downward directed component extending with gravity when moving in a direction extending towards the third side of the first corrugated media sheet from the second side of the first corrugated media sheet.

13. The evaporative cooling pack of claim 12, wherein:
the flutes of the third section begin at the second side of the first corrugated media sheet and do not extend to the third side of the first corrugated media sheet; and
the flutes of the first section begin offset from the second side of the first corrugated media sheet and end at the third side of the first corrugated media sheet.

14. The evaporative cooling pack of claim 5, wherein the first section of the plurality of flutes are adjacent a first portion of the second section of the plurality of flutes and the third section of the plurality of flutes are adjacent a second portion of the second section of the plurality of flutes.

15. The evaporative cooling pack of claim 1, including a plurality of first corrugated media sheets and a plurality of second corrugated media sheets, the plurality of first and second corrugated media sheets alternatingly stacked between first and second corrugated media sheets.

16. The evaporative cooling pack of claim 7, wherein each bend is positioned between each second and third sides and form an axis that is generally perpendicular to the reference line.

17. The evaporative cooling pack of claim 16, wherein the axis is positioned closer to each third side than each second side, the depth (d) being defined between the axis and each third side and perpendicular to the axis and the each third side.

18. An evaporative cooling system comprising:
an enclosure having a cooling fluid supply, an air inlet, and an air outlet;
the evaporative cooling pack of claim 1 positioned within the enclosure between the air inlet and the air outlet, the flutes of the first section of the plurality of flutes and the flutes of the second section of the plurality of flutes oriented such that air exiting the evaporative cooling fluid has an upward extending orientation.

19. The evaporative cooler of claim 18, wherein the cooling fluid supply is positioned such that cooling fluid flows through the evaporative cooling pack vertically downward due to gravity.

\* \* \* \* \*